S. C. BROWN.
MORTISING MACHINE.
No. 65,996. Patented June 25, 1867.
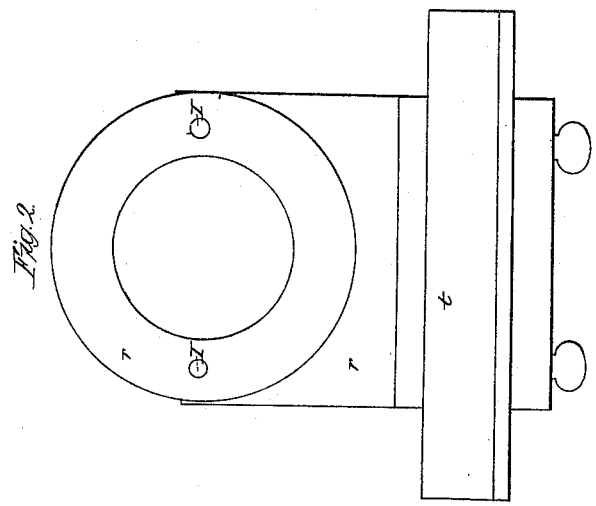
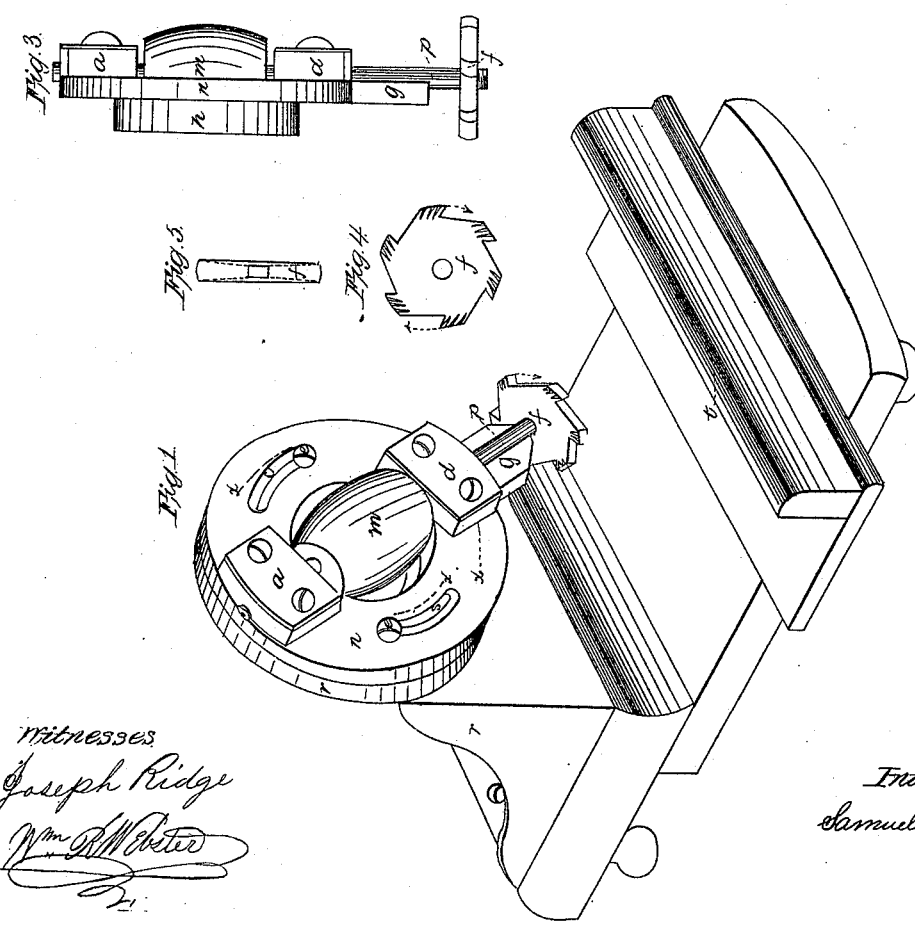
Witnesses
Joseph Ridge
Wm R Webster
Inventor
Samuel C Brown

United States Patent Office.

SAMUEL C. BROWN, OF RICHMOND, INDIANA, ASSIGNOR TO J. A. FAY & CO., OF CINCINNATI, OHIO.

Letters Patent No. 65,996, dated June 25, 1867.

IMPROVEMENT IN MORTISING MACHINE.

*The Schedule referred to in these Letters Patent and making part of the same.*

TO ALL WHOM IT MAY CONCERN:

Be it known that I, SAMUEL C. BROWN, of the city of Richmond, county of Wayne, and State of Indiana, have invented a new and useful Improvement in Machines for Mortising Window-Blinds, &c.; and I do hereby declare that the following is a full, clear, and exact description of the same, reference being had to the annexed drawings, making a part of this specification, in which—

Figure 1 is a perspective view.
Figure 2 is a view of the supporting section.
Figure 3, a view of the adjustable section.
Figure 4, a side view of the saw; and
Figure 5, an edge view of the same.

Similar letters of reference, when they occur in the different figures, represent corresponding parts of the machine.

My invention consists in constructing a blind-mortising machine in such a manner that the operation of mortising is materially simplified, the cutting being done with a saw, which is so constructed and arranged as to do the work of cutting a mortise effectually at a single operation, and is so attached, by suitable and efficient devices, that it may easily be adjusted after cutting one stile, to a position to cut the opposite stile for the same blind.

To enable others skilled in the art to make and use my invention, I will proceed to describe it with reference to the drawings.

$r$ $r$ represent the bed-plate or support, on a vertical or right-angular extension of which is formed a ring, as shown in fig. 2. $n$ represents an annular face-plate, equal in circumference to ring $r$, and is provided with a flange, $h$, fig. 3, which flange is circular, fitting the cavity in ring $r$, and serving as an axle to face-plate $n$. When plate $n$ is in position, the screws or bolts $e$ and $e$ serve to retain it, the screws or bolts being secured to bed-plate $r$ through the screw-holes or openings $i$ and $i$, shown in fig. 2. The extension $g$ of the box $d$ nearly reaching the saw in rear of mandrel $p$ is to support the latter from yielding to the pressure, when the saw $f$ is being operated. No corresponding extension of the journal or box is needed in front of the mandrel, consequently the saw is permitted to cut in depth to nearly half its diameter, it being desirable to make the mortise as nearly a half circle as possible. The sides of saw $f$ are concave, as shown in fig. 5, in consequence of which the teeth at the circumference of the saw are somewhat the thickest; and in order that filing the saw may not diminish the thickness of the teeth, and thereby ruin the saw, their thickness is made the same from front to rear, in consequence of which the saw is liable to heat by friction. To prevent the heating of the saw, I groove the teeth to a slight depth transversely to the line of their motion, as shown in figs. 1 and 4. $f$, fig. 1, represents the saw in one of its positions, the stile being laid, for mortising, parallel to guide $t$. The mortise is thereby cut obliquely, to suit one side of the blind. To cut the opposite stile, plate $n$ is turned on its axle or flange $h$, bringing the saw to a corresponding position on the opposite side of a vertical line. The distance to which plate $n$ may be turned is regulated by the slots $s$ and $c$. The saw is held in position by the screws or bolts $e$ and $e$, which latter, being tightened, prevent face-plate $n$, to which the saw is secured, from turning. The belt for driving the saw works from the rear, through the cavities in plates $r$ and $n$, over pulley $m$. The screws or bolts $e$ and $e$ being on a line, or nearly so, with the horizontal diameters of plates $r$ and $n$, the plate $n$ may be reversed, turning the saw upwards. If it is found desirable to do so, the machine may be placed with the mandrel horizontal, and the saw working vertically, or in any desired position. The bed-plate $r$ $r$ is secured by screws, or in any convenient manner, to a suitable bench for working the machine.

Having thus fully described my said invention, what I claim, and desire to secure by Letters Patent, is—

The cutter $f$, shaft $p$, and pulley $m$, attached to the flanged plate $n$, when said plate is made adjustable upon the bed-plate $r$, substantially in the manner and for the purpose set forth.

SAMUEL C. BROWN.

Witnesses:
JOSEPH RIDGE,
WM. R. WEBSTER.